Feb. 4, 1964    R. E. BOYLE    3,120,118
FLUID METER CALIBRATOR
Filed Jan. 23, 1961    4 Sheets-Sheet 1

FIG.—1

ROBERT E. BOYLE
INVENTOR.

BY Paul F Hanley
ATTORNEY.

Feb. 4, 1964 R. E. BOYLE 3,120,118
FLUID METER CALIBRATOR
Filed Jan. 23, 1961 4 Sheets-Sheet 3

ROBERT E. BOYLE
*INVENTOR.*

BY Paul F Hawley
*ATTORNEY.*

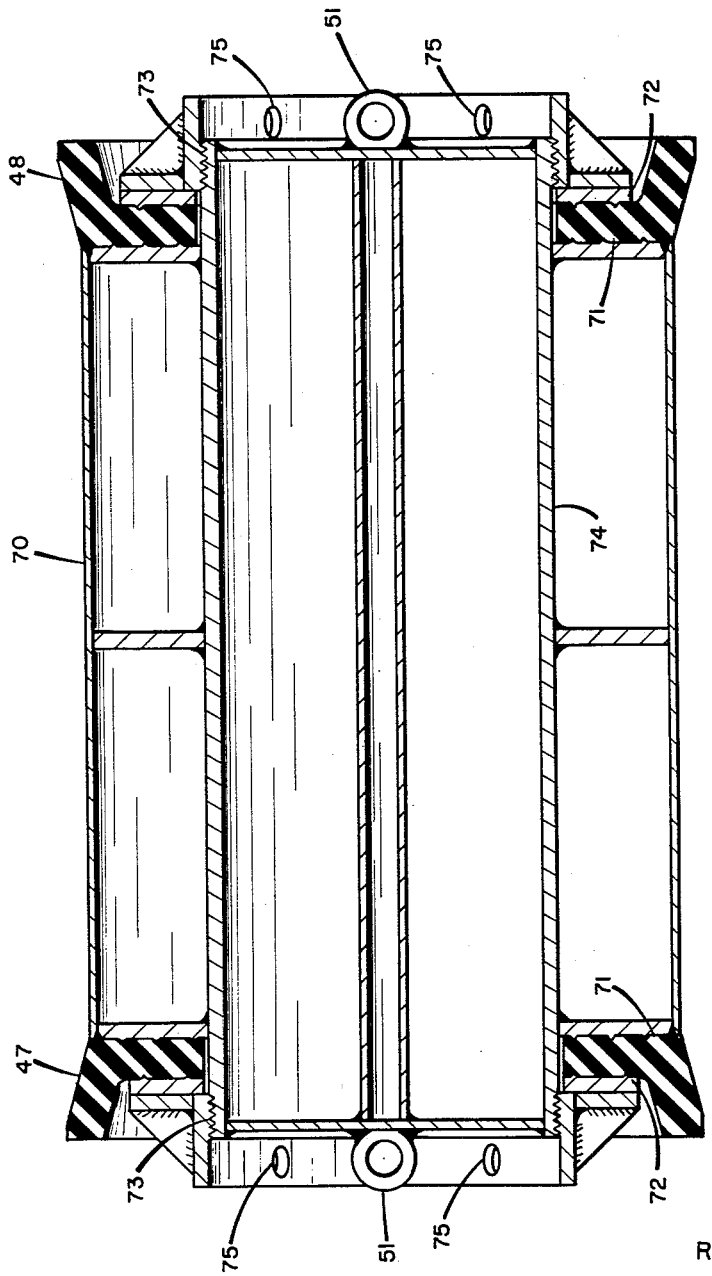

United States Patent Office 3,120,118
Patented Feb. 4, 1964

3,120,118
FLUID METER CALIBRATOR
Robert E. Boyle, Tulsa, Okla., assignor to Service Pipe Line Company, Tulsa, Okla., a corporation of Maine
Filed Jan. 23, 1961, Ser. No. 84,198
8 Claims. (Cl. 73—3)

My invention pertains to the measurement of fluid volume and more specifically to apparatus which can be used with great precision to measure the flow of liquid. It can, accordingly, serve as a calibration system for positive displacement meters and other types of flow meters. Generally, the system operates by causing the fluid to be measured to move a free piston along a calibration barrel provided with at least two proximity switches, none of the working parts of which penetrate within the barrel. Signals from the switches indicate the volume measured. This volume between two positions of the piston actuating these proximity switches has been accurately determined in a separate calibration. Preferably, if the system is used for calibrating a flow meter, the flow meter actuates a pulsation-type tachometer, and the two proximity switches are used to turn on and off a counter which measures the output of the tachometer.

Until recent years, the metering of large quantities of fluid, for example, in oil or refined products pipelines, has been carried out by collecting in tanks, the volumes of which were determined by actual measurement. More recently, various types of flow meters, some of which are positive displacement and some of which are turbine type, have been employed with considerable success. However, not only must such flow meters be calibrated before use to a high degree of precision, but ordinarily their accuracy is not a constant and they must be repeatedly calibrated in the course of use. It is possible to use a gauge tank for testing the accuracy of such flow meters, but this requires very large-capacity tanks. The prover tanks must have a capacity of from 1 to 2 minutes of flow. Also, the results are not obtained with as much precision as could be desired because of errors incurred in the stopping and starting of flow.

In view of this, various types of calibrators have been provided which do not use a tank. Such a system, for example, is found in U.S. Patent 2,772,561, Plank and Smith, issued December 4, 1956. This and similar systems use a length of pipe containing a free piston, connected in series with the meter to be calibrated and provided with two signal devices which indicate the passage of the piston (usually a pipeline scraper) to determine the known volume of fluid. My invention provides an improvement over the Plank-Smith system.

One practical difficulty which occurs when using a piston and calibrated barrel system is that the piston used to measure the fluid movement must necessarily have some flexible means of sealing to the barrel. Cup-type, synthetic rubber gaskets have been frequently employed for this purpose. These wiping elements must be elastic in order to eliminate passage of fluid since any bypassing proportionately reduces the accuracy of the measurement. All of the types of switches or signaling devices of which I am aware that have been taught for use with the Plank-Smith system have an actuator which protrudes mechanically into the interior of the calibration barrel. This protruding part is moved when the lip of the elastic member comes in contact with it, to actuate the signaling device. This produces a wearing effect on the elastic member. Also, due to the flexibility of this sealing element, there is no insurance that the signal announcing the passage of the piston will occur at precisely the same point of passage of this piston each time. Third, the accuracy of the entire system can be affected by liquid bypassing the piston lip while in contact with the switch. The passage of the free piston past the flow opening in the barrel distorts the elements as well as causing wear which, again, tends for inaccuracy.

Accordingly, it is an object of this invention to provide a novel method and apparatus for the measurement of fluid flow using passage of a free piston through a calibration barrel in which extreme percision in measuring the volume of the fluid can be achieved.

It is a further object of this invention to provide such a system in which the free piston makes a plurality of travels of the calibration barrel alternately in opposite directions to increase accuracy. It is a further object of this invention to provide such a system in which wear of the flexible seals on the free piston is minimized and bypassing of this piston is substantially eliminated. A still further object of the invention is to provide such a system with which a flow meter of high capacity may be rapidly and precisely tested. Further objects of this invention will be understood from the following description taken in connection with the attached drawings, in which:

FIGURE 6 is a cross-sectional view of a second design of free piston.

Figure 1:
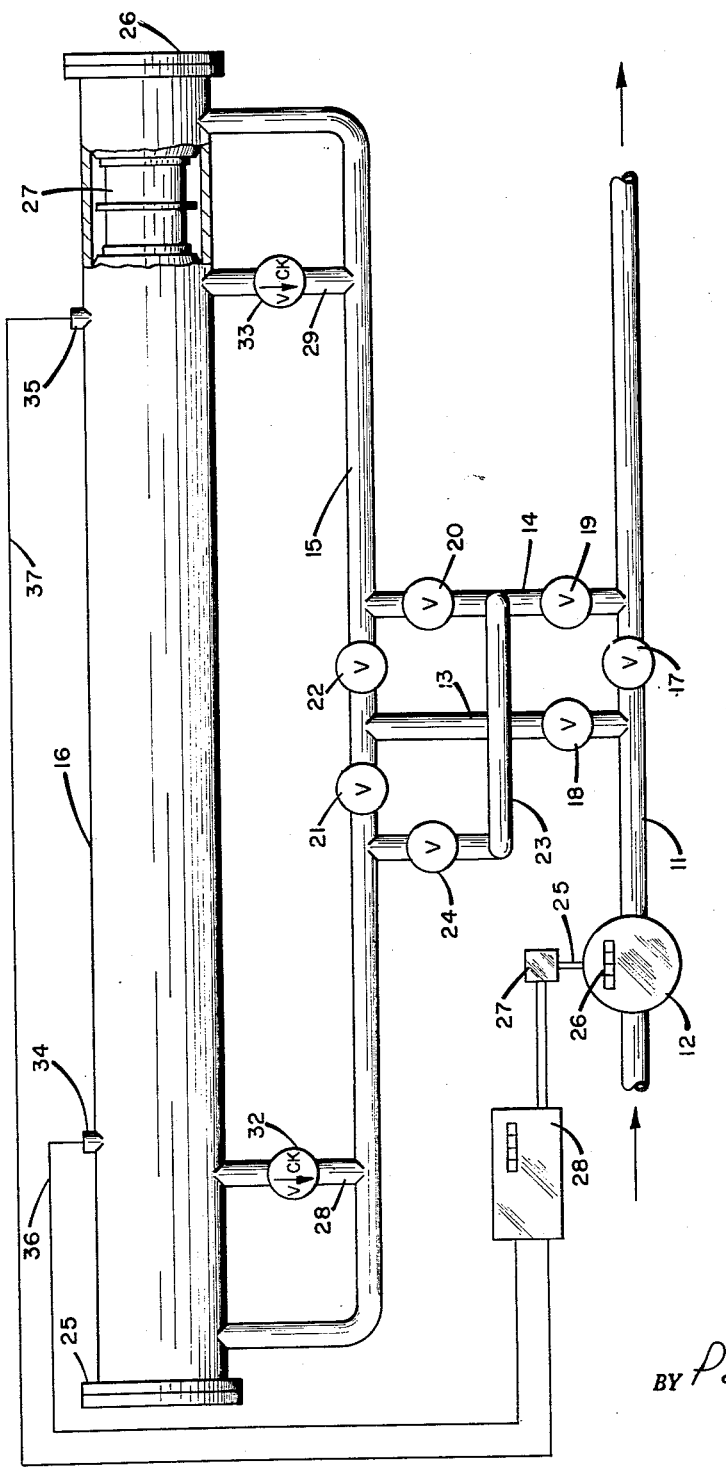
FIGURE 1 is a diagrammatic view of a pipeline including a flow meter, an associated calibration barrel with all piping and valves, and an electrical system used in conjunction with this apparatus for measuring the flow through this pipeline and for calibrating the flow meter.

FIGURE 1 shows a pipeline 11 in which a flow meter 12 has been inserted to measure volume of flow of the fluid through this line. Lines 13 and 14 connect the pipeline with a header 15 which, in turn, is connected to a calibration barrel 16 near the ends of this barrel. A valve 17 in the pipeline 11 is provided to direct the flow of fluid being metered by meter 12 into the calibration barrel through line 13 when valve 17 is closed. In this case, the fluid returns to pipeline 11 through line 14.

Lines 13 and 14 are equipped with valves 18, 19, and 20, respectively. Header 15 is equipped with valves 21 and 22. A return line 23 connects between valves 19 and 20 and to the header 15 at the left of valve 21. Flow through the return line 14 is controlled through valve 24. Preferably each of these valves is of the quick-opening butterfly type, though this is not a requirement.

The cylindrical calibration barrel 16 is provided with removable heads 25 and 26 through which the free piston 27 may be inserted in the barrel. An auxiliary flow line 28 and 29 is provided at each end of the header, joining it to the calibration barrel through flow ports 30 and 31. The flow ports are located between the ends of the header and spaced axially from the header entrance to the barrel by a distance greater than the length of the free piston 27. In each auxiliary flow line is located a check valve (32 and 33, respectively), set to open only on flow away from the calibration barrel.

The flow meters available generally include an output shaft 25, the rotation of which is directly related to the reading on the registering dials 26. This shaft is available for calibration purposes. In order to generate a signal directly proportional to the output of the flow meter, a tachometer generator 27 is connected to the output shaft. For example, a generator can be used in which one revolution of the shaft produces 1,000 pulses of electrical output. This output is fed into a counter, for example, an electronic counter 28. Such counters are commercially available at the present time and are equipped to be initiated by the presence or absence of one signal and to stop upon occurrence or lack of occurrence of a second signal. In the arrangement shown, the initiation and stopping of the electronic counter 28 is provided for by mounting two proximity switches 34 and 35 on the calibration barrel, both being located between the location of the flow ports 30 and 31. These proximity switches are connected through signal lines 36 and 37, respectively, to the counter 28 so that a signal from one of these proximity switches will turn on the counter while a signal from the other switch will turn it off. In between, the counter will count the pulses from generator 27.

The basic operation of this measurement system is essentially simple. When a measurement is to be made, for example, with the free piston in the right side of the calibration barrel 16 as shown in FIGURE 1, valves 22 and 24 are opened. Valves 20 and 21 are closed. Finally, valves 18 and 19 are opened and valve 17 is closed. The flow of liquid through the flow meter then passes through line 13 and the right side of header 15 into the right side of the calibration barrel, forcing the free piston 27 to travel to the left. When a ferromagnetic portion of this piston passes through a fixed position at the proximity switch 35 (to be described in detail subsequently), a flow of current occurs through line 37 actuating counter 28 which commences to record the output of the electric signal coming from tachometer 27. As the free piston travels farther to the left, ultimately it will, in turn, actuate the proximity switch 34, causing a flow of current through line 36 which, in turn, shuts off the counter 28. The reading on this counter which is proportional to the amount of fluid indicated by flow meter 12 can then be compared with the calibrated amount of fluid known to have passed (by prior calibration of the calibration barrel). The free piston continues to travel to the left until piston 27 has passed flow port 30, at which time the total flow goes through flow port 30 and check valve 32. At this time, free piston 27 comes to rest between the left entrance of header 15 and flow port 30.

Preferably a second measurement is made at this point, in which case valves 20 and 21 are opened, and valves 22 and 24 are closed. This causes flow of the fluid passing through the flow meter 12 through the left side of header 15 forcing the free piston 27 from left to right through the calibration barrel 16. Proximity switch 34 is first actuated, causing the counter 28 to turn on and record the output of tachometer 27 until this counter is turned off by actuation of proximity switch 35. The free piston then comes to rest in the position shown in FIGURE 1, that is, past the flow port 31, but before the opening of header 15 into the right side of calibration barrel 16.

In the preferred method of operation of this system, a number of measurements are made alternately, causing the free piston to travel first in one direction and then in the opposite direction until a suitable number of readings, for example, at least five, have been made. The sum total of the known volume of displaced fluid measured by the calibration barrel can then be compared to the total reading on the counter 28 and the "meter factor," that is, the quantity by which the indicated reading on the meter 12 should be multiplied by to obtain the true liquid volume, can be ascertained.

As was earlier mentioned, one main improvement on the basic system consists in the using of proximity switches which do not alter the inside surface of the calibration barrel. This is better described by reference to FIGURES 2 and 3. The proximity switch may consist, for example, of a transformer in which there is incomplete coupling between the primary and two opposing secondary coils. This coupling is adjusted to give zero output from the secondary. When ferromagnetic material passes adjacent a fixed position with respect to this proximity switch, an output signal is produced due to the change of coupling by the external piece of ferromagnetic material. This causes a signal to occur each time when the ferromagnetic material reaches a fixed orientation with respect to the proximity switch. In practice this signal output is amplified and fed to a relay which, in turn, can either close or open a circuit as desired.

Figure 2:
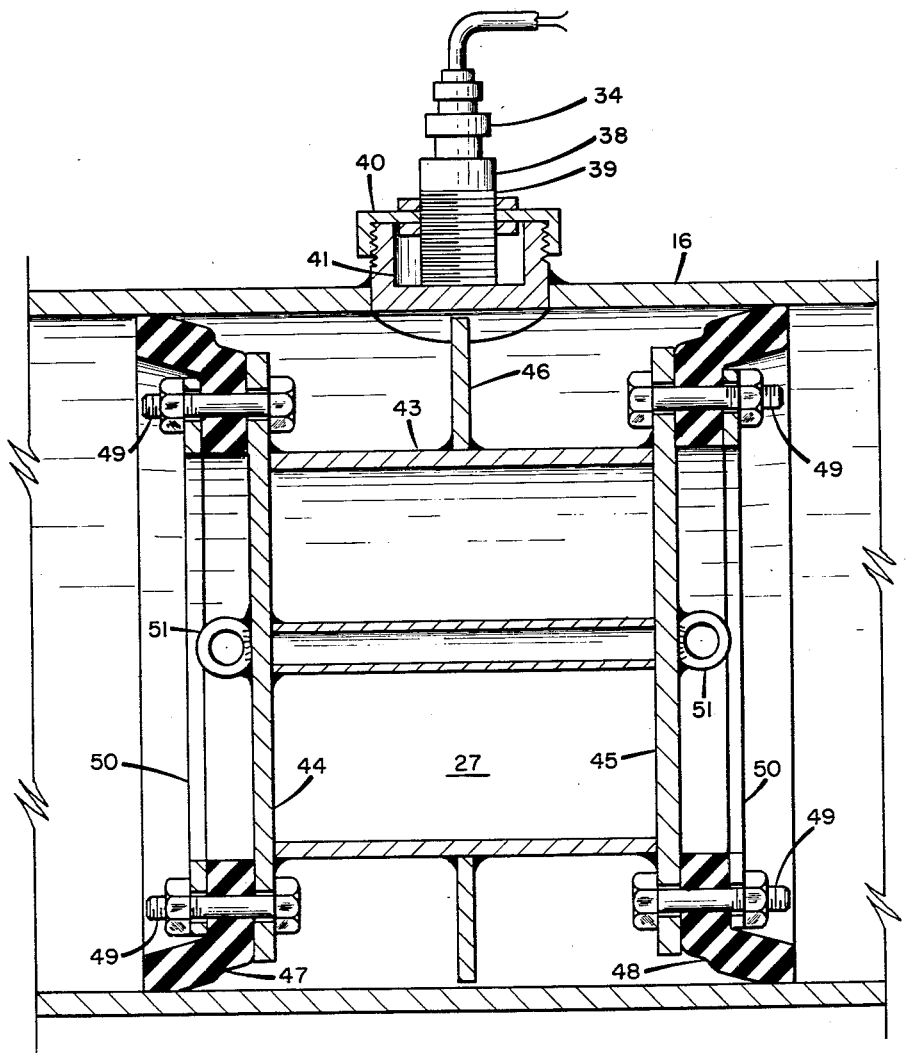
FIGURE 2 is a diagrammatic view illustrating one design of free piston and an associated proximity switch useful in this invention.
Figure 3:
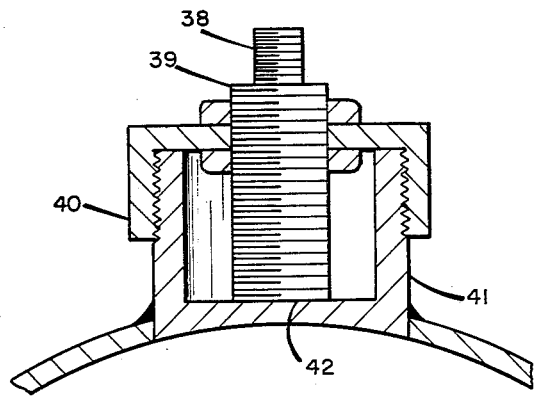
FIGURE 3 is a second view of the mount for the proximity switch.

Such a proximity switch is shown in greater mechanical detail in FIGURES 2 and 3. The barrel 38 is attached, for example, by means of threads 39, to a mechanical coupling 40 which holds the end of the barrel 38 firmly against the proximity switch mount 41. In the figures shown, this comprises a cup of nonmagnetic material such as stainless steel welded into a port in the calibration barrel 16, so that the port is sealed fluid-tight. The inner surface of this port is machined, as shown in FIGURE 3, so that the mount inside surface is shaped substantially identical to the inner surface of the calibration barrel immediately adjacent. The lower end 42 of this proximity switch is the sensitive end; that is, bringing a piece of ferromagnetic material such as soft iron or the like close to the lower end 42 of barrel 38 produces a signal.

A suitable free piston is also shown in greater detail in FIGURE 2. This consists of a main frame 43 and end plates 44 and 45. Preferably, though not necessarily, the end plates are either of much smaller diameter than that of calibration barrel 16 or else are made of nonmagnetic material. A ring 46 which is made of ferromagnetic material is firmly fastened at some point on the free piston framework. Ordinarily, it is desirable to have the outside diameter of the magnetic ring 46 approximately ⅛ inch to ¼ inch less than the interior diameter of the calibration barrel 16. Wiping washers or gaskets 47 and 48 (made of flexible materials such as Thiokol or other elastomer which is chemically stable in the presence of the fluid to be metered) are bolted to the end plates 44, for example, by bolts 49 and washers 50. Preferably a ring 51 is firmly attached on each end plate to facilitate removal from the calibration barrel 16.

With the arrangement of piston and proximity switch mount shown, I have found that the electric signal generated by the proximity switch when the free piston passes is remarkably constant and, in fact, locates the piston considerably more accurately than can any mechanical switch actuated by being pressed into contact with a flexible wiper washer such as 47 or 48. It is this remarkable consistency in location which permits precise calibration of this flow system.

Figure 4:
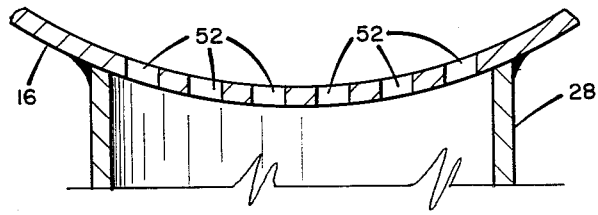
FIGURE 4 is a view of a flow port near one end of the calibration barrel.

This is aided by the fact that the support offered by the calibration barrel to the outer lips of the flexible wiper washers 47 and 48 is substantially constant throughout the travel of the piston 27 throughout the calibration barrel. Thus, for example, flow ports 30 and 31 are not permitted to be one complete orifice but, as shown in FIGURE 4, are broken up into a plurality of small orifices, the area of each being small compared to the area of the cross section of the calibration barrel 16. These small orifices permit flow of liquid from the calibration barrel through the exhaust lines 28 and 29, respectively, while insuring that the shape of the flexible lips on wipers 47 and 48 continues to be the same on each trip. These orifices, incidentally, may be long and narrow or substantially circular in cross section, the shape being fairly unimportant as long as there are sufficient ribs between orifices so that the flexible end of wiper elements 47 or 48 are supported as the piston 27 arrives at the end of its stroke. I have found that it is possible to make the openings 52 in the form of slots which are axially longitudinal in the calibration barrel, the edges of these slots being made smooth and the width of each slot being not substantially greater than the width of the metal left between the slot.

Another advantageous though not completely necessary improvement in this system is to make all the metallic parts of the piston 27 except for the triggering piece of ferromagnetic material (such as ring 46) out of aluminum or some other light, nonmagnetic metal. The piston also has buoyancy in the fluid, which lowers its effective weight. Decreasing the weight of this piston decreases the wear on the flexible wipers 47 and 48 and permits great precision to be maintained over a longer period of time than otherwise is possible.

FIGURE 6 shows a second form of free piston. The metallic parts of this piston are of steel. The chief differences between this piston and that shown earlier are that the outer surface of the piston between wiper cups 47 and 48 is a cylindrical member 70 of a diameter only a little less than that of the cups, and that the wiper cups are solid, maintained in position between flanges 71 and 72 without bolts 49 (as in FIGURE 2). Instead, threaded tightening members 73 threaded on body 74 are screwed on until the cups 47 and 48 are held securely in place. The internal part of the piston is hermetically sealed. Holes 75 in members 73 provide a simple means of tightening.

When using the piston shown in FIGURE 6, it is apparent that the proximity switch will be actuated by the leading edge of member 70 as the piston nears the end of its stroke.

There are two simple ways to calibrate the calibration barrel 16, that is, to determine the volume of liquid displaced during the travel of a metal float between actuation of the two proximity switches 34 and 35. In the first of these, the calibration barrel is temporarily mounted approximately vertical and a small indicator light is mounted in each of the leads 36 and 37, which are temporarily disconnected from the counter 28. Sufficient liquids, for example, water, is pumped into the lower end of the calibration barrel to displace the metal float above the actuation point for proximity switch 34. A suitable temporary drain is connected to the lower part of the calibration barrel (for example, in line 15), leading to calibrated measuring cans or similar primary volumetric calibration system for the water. The water is then slowly drained from the calibration barrel until proximity switch 34 is actuated as indicated by the lighting of the lamp connected across the leads 36. At this instant the flow of water is directed into the calibrated measuring cans or other volumetric determining means. The liquid is collected until the light connected across leads 37 flashes on, at which point the flow of water from calibration barrel 16 is terminated. The volume collected is then accurately measured. This measurement is preferably repeated a plurality of times for precision. The barrel is then inverted and the same type of measurement made for the free piston moving in the opposite direction.

The second calibration system permits the calibration barrel 16 to be oriented in a horizontal position. The free piston 27 is inserted in the barrel and the barrel is filled with water. Pressure is then applied at one end to the piston and water is drawn off at the other end. The water calibration starts (through the same type of calibrated measuring cans or other volumetric measurement means) when the first proximity switch is actuated, lighting an electric bulb placed temporarily across the leads such as 36 or 37. The calibration terminates when the piston similarly passes by the other switch, as indicated by the second temporarily wired light going on. The pressure is then reversed and the piston directed in the other direction. One run in each direction constitutes what I regard as the minimum calibration for this system. This eliminates any error that might be introduced by one switch being more sensitive than the other. The measurement of the amount of liquid is, of course, well-known to those skilled in this art and is found in any modern book on hydraulics.

Figure 5:
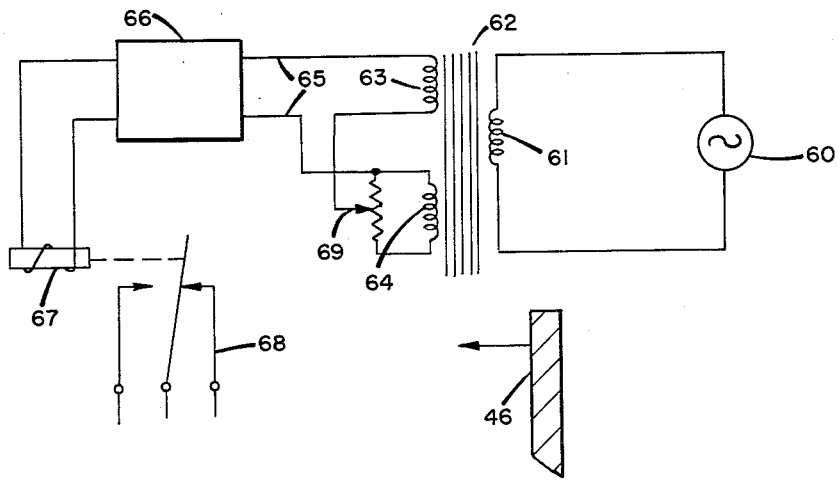
FIGURE 5 is a schematic diagram of the proximity switch.

A number of varieties of proximity switches can be employed. I have illustrated diagrammatically in FIGURE 5 one such system in which a voltage from a source 60 is applied to a primary coil 61 of a transformer having a core 62. Two substantially secondary coils 63 and 64 are provided. These are connected in series opposition by leads 65. One coil is connected across a potentiometer 69. In turn, leads 65 preferably are connected to an amplifier 66, the amplified output of which is applied across a relay coil 67 which actuates the relay contact 68. In operation the assembly consisting of the primary coil 61, core 62, and coils 63 and 64 are located, for example, in barrel 38 of the proximity switch, and the entire assemblage is mechanically connected in place. With the cover removed from the proximity switch, the potentiometer 69 is adjusted until with no ferromagnetic material adjacent the sensitive end of the proximity switch no output is obtained across leads 65. The instrument is then ready for use. Passage of a ferromagnetic material such as ring 46 close to the sensitive end of the proximity switch increases the coupling of coil 64 to coil 61 as compared to that of coil 63 and produces an output across leads 65 which, in turn, produces energizing current to the relay coil 67 actuating the contact 68.

It is to be understood that other types of proximity switches besides the electromagnetic can be employed. For example, capacitive proximity switches are by now well-known in the control art and these can be incorporated in the calibration system shown simply by making the proximity switch mount 41 out of a dielectric material such as a strong plastic. Of course, in all cases the inner surfaces of the mount is kept in complete correspondence to the inner surface of the adjacent barrel. It should be apparent that the term "proximity switch" as used throughout the specification and claims refers to static apparatus (no moving parts) which produces an electric signal of usable amplitude whenever a metallic part of the piston arrives at a fixed distance from this switch.

The entire system shown is capable of great precision as mentioned above. An illustration will make this more apparent. One such system which was recently calibrated had a calibration barrel approximately 20 inches in diameter. The second system of calibration outlined was used to determine the volume of this system, careful attention being given to the temperature and correction of the volume by the ordinary water tables being employed. On run No. 1, the piston traveling eastward, the total cubic inches measured were 114,912.3688 and on the return west run, 115,049.3636 cubic inches, averaging 114,980.8662 cubic inches. A second run was then made. That in the eastward direction was 114,934.4180 cubic inches and that to the west, 115,054.2034 cubic inches, or an average of 114,994.3107 cubic inches. The difference between the first and second calibration runs was, therefore, 13.44445 cubic inches or 0.0117 percent. When it is considered that the total volume involved in the calibration was 11.8519 barrels, it is seen that this was a very careful calibration of a very large volume. This would be sufficient for use with a flow meter of 36,000 barrels per day, for example.

Another use of the proximity switch 34 mounted on the barrel is that it can be used as a scraper or "pig" locater. In such case the proximity switch is mounted just as shown in the figures but on a part of the regular pipeline. Such scrapers are built, at least in part, of ferromagnetic material which is near enough the periphery of the pipe so that the proximity switch is actuated. The output of the associated amplifier 66 in this case is used to actuate a notifying device such as a signal light, horn, buzzer, or relay controlling operation of a station to allow automatic passage of the scraper.

The use of this particular system provides for a prover or calibration barrel with no projections into the barrel. With no projections, the wear on the cups is reduced. The chances of the fluid by-passing the cups while passing under the switch are eliminated. Errors from mechanical hanging-up of the conventional switches which protrude into the calibration barrel are eliminated. There can be no clogging of the switch opening. The stainless steel housing that the proximity switch fits into is contoured to the radius of the pipe and welded to the pipe, thus isolating the switch. This additionally allows the proximity switches to be removed and used at other locations, if desired, or replaced with ease. Finally, the unbroken interior of the prover barrel provides for two precise means of calibration of the prover to determine the average volume. The system is admirably adapted for use either on a permanent basis, or, by providing for flexible lines 13 and 14 with quick disconnect couplings, this system can be truck-mounted and moved from place to place as needed. The apparatus is simple, sturdy, precise and relatively inexpensive, permitting an accuracy of calibration of flow meters which is considerably beyond that obtainable with other systems.

I claim:

1. Apparatus for calibrating a flow meter in a pipeline including signal means for producing a signal directly proportional to the output of said flow meter, a calibration barrel connected in series with said flow meter, a movable piston in said barrel, flexible means on said piston sealing off flow between said barrel and said piston, two proximity switches spaced apart on said barrel, the inside surface of said barrel being continuous and smooth throughout a zone extending completely between and at least slightly beyond each of said proximity switches, and a counter connected to said signal means adapted to measure said signal and produce an indication of said measurement, said counter being connected to said proximity switches such that actuation of one initiates said counter while actuation of the other terminates operation of said counter.

2. Apparatus for calibrating a flow meter in a pipeline including signal means for producing a signal which is a constant multiple of the output of said flow meter, a calibration barrel, conduit means connected in series with said flow meter for selectively connecting alternate ends of said barrel to said flow meter, a movable piston in said barrel, flexible means on said piston sealing off flow between said barrel and said piston, two mounts for proximity switches connected to said barrel but spaced axially apart thereon, each said mount being shaped substantially identically on the inner surface thereof to the inner surface of said barrel adjacent the mount, two proximity switches each of which is located in one of said mounts, and a counter connected to said signal means adapted to measure said signal and produce an indication of said measurement, said counter being connected to said proximity switches such that actuation of one initiates said counter while actuation of the other terminates operation of said counter.

3. Apparatus for calibrating a flow meter in a pipeline including signal means connected to said flow meter for producing a signal which is a constant multiple of the output of said flow meter, a cylindrical calibration barrel connected in series with said flow meter, a movable piston in said barrel, flexible means on said piston sealing off flow between said barrel and said piston, said barrel containing a flow port near each end thereof and two measuring ports spaced axially apart but located between said flow ports, two mounts for proximity switches sealing said measuring ports, each said mount being shaped substantially identically on the inner surface thereof to the inner surface of said barrel adjacent the mount, each of said flow ports comprising a plurality of holes the area of each being small compared with the area of the cross section of said barrel, the inner surface adjacent each of said holes being substantially identical in shape to the inner surface of said barrel adjacent said flow ports, two proximity switches each of which is located in one of said mounts, and a counter connected to said signal means adapted to measure said signal and produce an indication of said measurement, said counter being connected to said proximity switches such that actuation of one initiates said counter while actuation of the other terminates operation of said counter.

4. Apparatus for calibrating a flow meter in a pipeline including signal means connected to said flow meter for producing electric pulses the number of which is a constant multiple of the output of said flow meter, a cylindrical calibration barrel of magnetic material connected near each end to a side conduit, removable ends for sealing each end of said barrel, a movable free piston in said barrel, flexible means on said piston sealing off flow between said barrel and said piston, said barrel containing a flow port near each end and between said side conduits but spaced further from the adjacent side conduit than the thickness of said piston, each of said flow ports comprising a plurality of holes the area of each being small compared with the area of the cross section of said barrel, the inner surface adjacent each of said holes being substantially identical in shape to the inner surface of said barrel adjacent said flow ports, said barrel also containing two measuring ports spaced axially apart but located between said flow ports, two mounts of substantially nonmagnetic materials sealing said measuring ports, each said mount being shaped substantially identically on the inner surface thereof to the inner surface of said barrel adjacent the mount, two proximity switches each of which is located in one of said mounts, a counter connected to said signal means adapted to measure said signal and produce an indication of said measurement, said counter being connected to said proximity switches such that actuation of one initiates said counter while actuation of the other terminates operation of said counter, two flow lines each containing a check valve and each connected to a flow port at one end and to said pipeline, means for selectively connecting said flow meter in series to one side conduit, and means for connecting the other side conduit and adjacent flow port back to said pipeline so that fluid flows in series through said flow meter, calibrating barrel, and said pipeline.

5. Apparatus in accordance with claim 4 in which said piston contains a circumferential ring of magnetic material closely spaced to the inner wall of said barrel.

6. Apparatus in accordance with claim 5 including valves in the last two mentioned means for reversing flow of fluid through said barrel without changing direction of flow through said flow meter.

7. Apparatus for indicating arrival of a piston moving through a pipeline including a proximity switch mount forming a part of the wall of said pipe but of material having at least one physical characteristic greatly different from the same characteristic of said pipeline and of said piston, a proximity switch positioned in said mount, said switch being sensitive to change in said physical characteristics of materials adjacent the mounted end of said switch, and a notifying device connected to said switch and adapted to be actuated thereby.

8. Apparatus for calibrating a flow meter in a pipeline including signal means for producing a signal which is a constant multiple of the output of said flow meter, a calibration barrel connected in series with said flow meter, a movable piston in said barrel, flexible means on said piston sealing off flow between said barrel and said piston, two mounts for proximity switches connected to said barrel but spaced axially apart thereon, each said mount being shaped substantially identically on the inner surface thereof to the inner surface of said barrel adjacent the mount, two proximity switches each of which is located in one of said mounts, and a counter connected to said signal means adapted to measure said signal and produce an indication of said measurement, said counter being connected to said proximity switches such that actuation of one initiates said counter while actuation of the other terminates operation of said counter.

References Cited in the file of this patent

UNITED STATES PATENTS

| | | |
|---|---|---|
| 2,772,561 | Plank et al. | Dec. 4, 1956 |
| 2,792,705 | Barrett | May 21, 1957 |
| 2,994,015 | Eidam | July 25, 1961 |
| 3,021,703 | Pfrehm | Feb. 20, 1962 |